(12) United States Patent
Kavanaugh et al.

(10) Patent No.: US 9,296,962 B2
(45) Date of Patent: Mar. 29, 2016

(54) SYSTEM AND PROCESS FOR GASIFYING BIOMASS PRODUCTS

(75) Inventors: Bart Kavanaugh, Miami Beach, FL (US); Donald W. Kendrick, Bellevue, WA (US); Steven Kushnick, Marietta, GA (US); Steven R. Brncic, Eureka, MO (US)

(73) Assignee: Starlight Energy Holdings LLC, Dover, DE (US)

( * ) Notice: Subject to any disclaimer, the term of this patent is extended or adjusted under 35 U.S.C. 154(b) by 990 days.

(21) Appl. No.: 13/223,227

(22) Filed: Aug. 31, 2011

(65) Prior Publication Data
US 2012/0055089 A1    Mar. 8, 2012

Related U.S. Application Data

(60) Provisional application No. 61/379,305, filed on Sep. 1, 2010, provisional application No. 61/388,496, filed on Sep. 30, 2010, provisional application No. 61/421,559, filed on Dec. 9, 2010.

(51) Int. Cl.
| | |
|---|---|
| C10B 1/04 | (2006.01) |
| C10J 3/00 | (2006.01) |
| C10J 3/48 | (2006.01) |
| C10J 3/50 | (2006.01) |
| C10J 3/72 | (2006.01) |
| C10K 1/02 | (2006.01) |

(52) U.S. Cl.
CPC *C10J 3/487* (2013.01); *C10J 3/506* (2013.01); *C10J 3/721* (2013.01); *C10K 1/026* (2013.01); *C10J 2200/152* (2013.01); *C10J 2300/0909* (2013.01); *C10J 2300/0916* (2013.01); *C10J 2300/0956* (2013.01); *C10J 2300/0959* (2013.01); *C10J 2300/165* (2013.01); *C10J 2300/1693* (2013.01); *Y02E 50/14* (2013.01); *Y02P 20/145* (2015.11)

(58) Field of Classification Search
USPC ......... 48/197 R, 127.9, 127.1, 71, 72, 73, 76, 48/77, 69, 200, 201, 202, 203, 204, 61
See application file for complete search history.

(56) References Cited

U.S. PATENT DOCUMENTS 2,660,966 A * 12/1953 Lyons ........................... 110/258
2,878,110 A *  3/1959 Altstaedt et al. ................ 48/203

(Continued)

FOREIGN PATENT DOCUMENTS

CA         1308910      10/1992
WO     WO9632163 A1   10/1996

OTHER PUBLICATIONS

International Search Report dated May 1, 2012, PCT/US2011/050093.

*Primary Examiner* — Kaity Handal
(74) *Attorney, Agent, or Firm* — Neal, Gerber & Eisenberg LLP

(57) ABSTRACT

A system for gasifying biomass materials is provided. The system includes a gasifying unit for converting the biomass materials into a gas and a feeder mechanism for introducing the biomass materials into the gasifying unit. The gasifying unit includes a plurality of gasifying medium and biomass injection ports distributed along a vertical length of the gasifying unit, and each of the plurality of injection ports has a corresponding injection angle. The injection angles include at least one of an upward tangential angle and a downward tangential angle.

21 Claims, 10 Drawing Sheets

(56) References Cited

U.S. PATENT DOCUMENTS

| | | | |
|---|---|---|---|
| 4,146,369 A * | 3/1979 | Flesch et al. | 48/203 |
| 4,580,504 A | 4/1986 | Beardmore | |
| 4,585,543 A | 4/1986 | Duncan et al. | |
| 4,693,729 A | 9/1987 | Beckman et al. | |
| 4,710,202 A * | 12/1987 | Gohler et al. | 48/73 |
| 4,778,488 A | 10/1988 | Koers | |
| 4,929,254 A | 5/1990 | Kooiman et al. | |
| 4,940,473 A | 7/1990 | Benham | |
| 5,666,890 A | 9/1997 | Craig et al. | |
| 6,530,978 B2 | 3/2003 | McQuigg et al. | |
| 6,972,114 B2 | 12/2005 | Pope et al. | |
| 7,603,841 B2 | 10/2009 | Steele et al. | |
| 8,580,151 B2 * | 11/2013 | Troxclair, III | 252/373 |
| 2006/0249021 A1 | 11/2006 | Rogers | |
| 2006/0265954 A1 | 11/2006 | Dogru et al. | |
| 2007/0094929 A1 | 5/2007 | Kang et al. | |
| 2007/0137169 A1 | 6/2007 | Ishigami et al. | |
| 2008/0098653 A1 | 5/2008 | Patil et al. | |
| 2008/0155899 A1 | 7/2008 | Ramamurthy | |
| 2008/0163548 A1 | 7/2008 | Shinada et al. | |
| 2008/0250714 A1 | 10/2008 | Palonen et al. | |
| 2009/0020456 A1 * | 1/2009 | Tsangaris et al. | 208/133 |
| 2009/0090053 A1 | 4/2009 | Feldman | |
| 2009/0199479 A1 | 8/2009 | Taylor | |
| 2009/0265987 A1 | 10/2009 | Xu et al. | |
| 2010/0162625 A1 | 7/2010 | Mills | |

* cited by examiner

SYSTEM AND PROCESS FOR GASIFYING BIOMASS PRODUCTS

CROSS-REFERENCE TO RELATED APPLICATIONS

This non-provisional patent application claims priority to U.S. Provisional Patent Application No. 61/379,305, filed on Sep. 1, 2010, and U.S. Provisional Patent Application No. 61/388,496, filed on Sep. 30, 2010 and U.S. Provisional Application No. 61/421,559, filed on Dec. 9, 2010, all of which are incorporated by reference in their entirety.

TECHNICAL FIELD

This invention generally relates to systems and processes for converting feedstock into energy, and more particularly to a system and process for gasifying biomass that minimizes tar production and maximizes char burnout and resultant producer gas calorific content.

BACKGROUND OF THE INVENTION

Between 1988 and 2008, the number of landfills in the US fell by seventy-seven percent (77%) based on a Municipal Solid Waste Report issued by the United Stated Environment Protection Agency (EPA). The price paid to landfills to take in waste ("tipping fee"), has increased by twenty-three percent (23%) between 2002 and 2008, creating a need to convert these types of waste feedstocks into higher value usages. To help reduce the volume of waste put into landfills, incineration has been used, but is not a viable long term option due to its negative environmental impacts. On the other hand, gasification, a process that converts carbonaceous materials or products into heat and power has also been used (with special attention to biomass products selection) in order to reduce the volume of waste feedstocks while simultaneously generating useable heat and power.

Conventional biomass gasification systems typically suffer from several issues that have currently limited their usage. Because of these limitations, restrictions on feed quality, size, moisture content, etc. must be imposed. Further, the current gasification strategies provide insufficient control over the key gasification steps and reactions, thereby yielding a non-optimized "producer gas" (PG) output stream which is low in calorific content, high in tar, and promotes incomplete char burnout. These problems can be traced, in many situations, to the crude feedstock injection and mixing strategies and non-optimal gasifier flow field conditions. The low calorific value PG thus generated is typically associated with less than a 70% gasification conversion efficiency, defined as the rate of energy output to input. The construction and costs associated with remedying these shortcomings can also be prohibitive. Remediation typically requires stringent feedstock control and/or costly preprocessing of the feedstock. Ash slagging and material handling further can cause additional complications and typically demand "pre-treated" (dried or compacted/densified) feedstocks. The costs associated with such refined biomass feedstocks are substantially greater than the lower cost and more readily available feedstocks, thereby adversely effecting system economics.

Therefore, to remedy these traditional technical and economic shortcomings, there is a need for a gasification system that produces an improved producer gas output stream from a variety of 'low grade" or waste biomass materials, while minimizing tar production, energy input, and char carryover.

SUMMARY OF THE INVENTION

This description summarizes some aspects of the present embodiments and should not be used to limit the claims. The foregoing problems are solved and a technical advance is achieved by a system, process, and articles of manufacture consistent with the present invention, which provides an improved gasification of biomass materials or products, such as wastes feedstocks.

One aspect of the invention is directed to a system for gasifying biomass materials, comprising a gasifying unit for converting the biomass materials into a gas, wherein the gasifying unit is configured to enable the biomass materials and other matter contained within the gasifying unit to move in a specified flow pattern at a specified velocity; and a feeder mechanism for introducing the biomass materials into the gasifying unit wherein the feeder mechanism is configured to accelerate the biomass materials to the specified velocity in the gasifying unit.

Another aspect is directed to a system for gasifying biomass products. The system includes a gasifying unit for converting the biomass materials into a gas and a feeding mechanism for introducing the biomass materials into the gasifying unit. The gasifying unit includes a plurality of injection ports distributed vertically along one or multiple circumferential locations, i.e. diametrically opposed for two sided injection, for instance, and each of the plurality of injection ports has a corresponding injection angle. The injection ports inject tangentially a gasifying medium and/or biomass into the gasifying unit at prescribed angles, and the injection angles may be orientated horizontally, upwards and/or downwards. Additional aspects and benefits will be known to those of skill in the art.

DETAILED DESCRIPTION OF PREFERRED EMBODIMENTS

Figure 1:
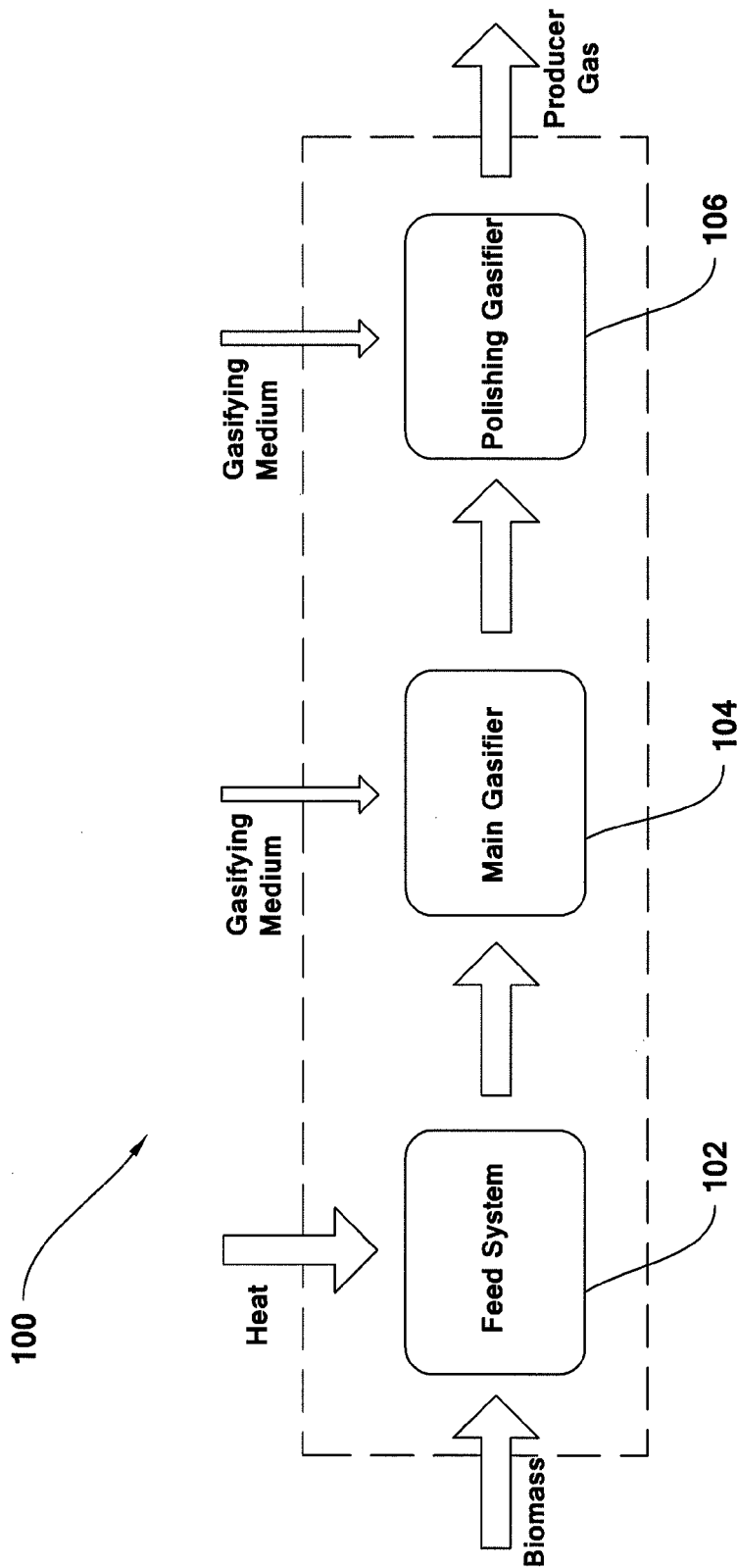
FIG. 1 is a block diagram illustrating a portion of a biomass gasification system in accordance with one embodiment of the present invention.

While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

The figures listed above illustrate the preferred embodiments of the invention and the operation of such embodiments. Where the same element appears in multiple figures, the same reference numeral is used to denote the element or part in all of the figures where it appears. Only those parts of the various units are shown and described which are necessary to convey an understanding of the embodiment to those skilled in the art. Those parts and elements not shown are conventional and known in the art.

Figure 2:
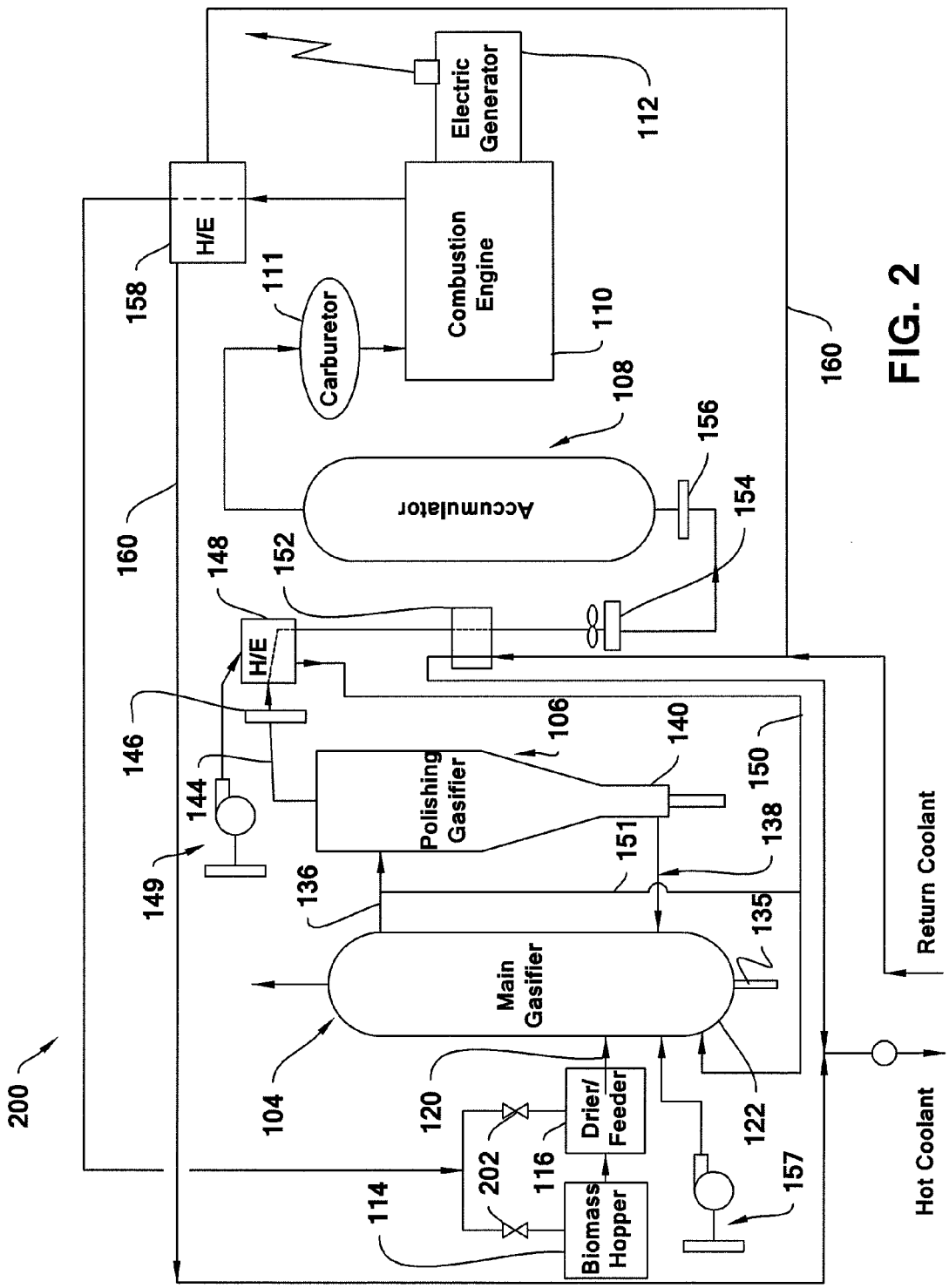
FIG. 2 is a schematic diagram of the biomass gasification system of FIG. 1 coupled to a producer gas accumulator that feeds the producer gas to a combustion engine (internal combustion—spark ignition, diesel—compression ignition, and/or gas turbine) which in turn drives an electric generator in accordance with the present invention.
Figure 3:
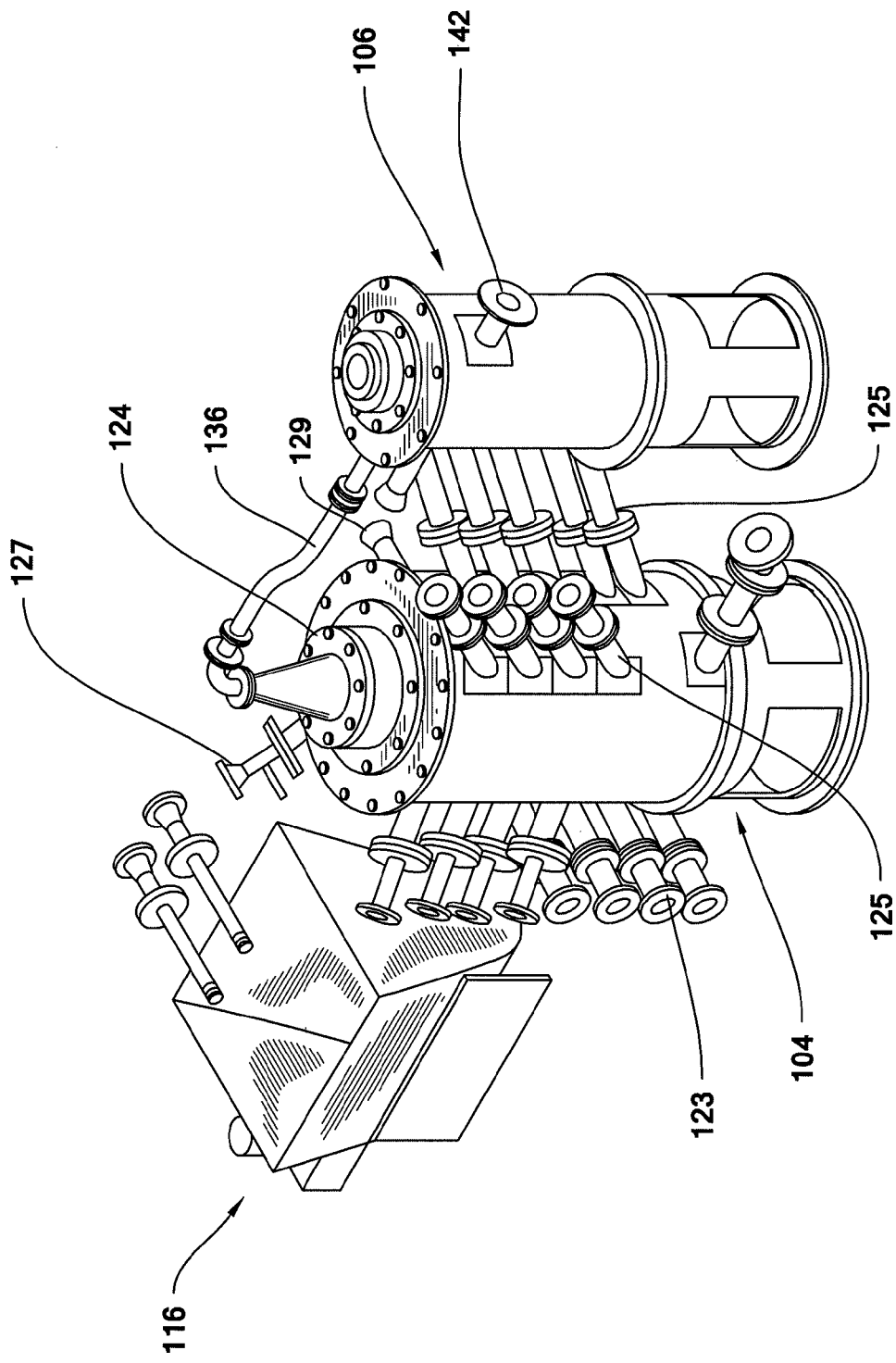
FIG. 3 illustrates a perspective view of the gasification system of FIG. 1.
Figure 4:
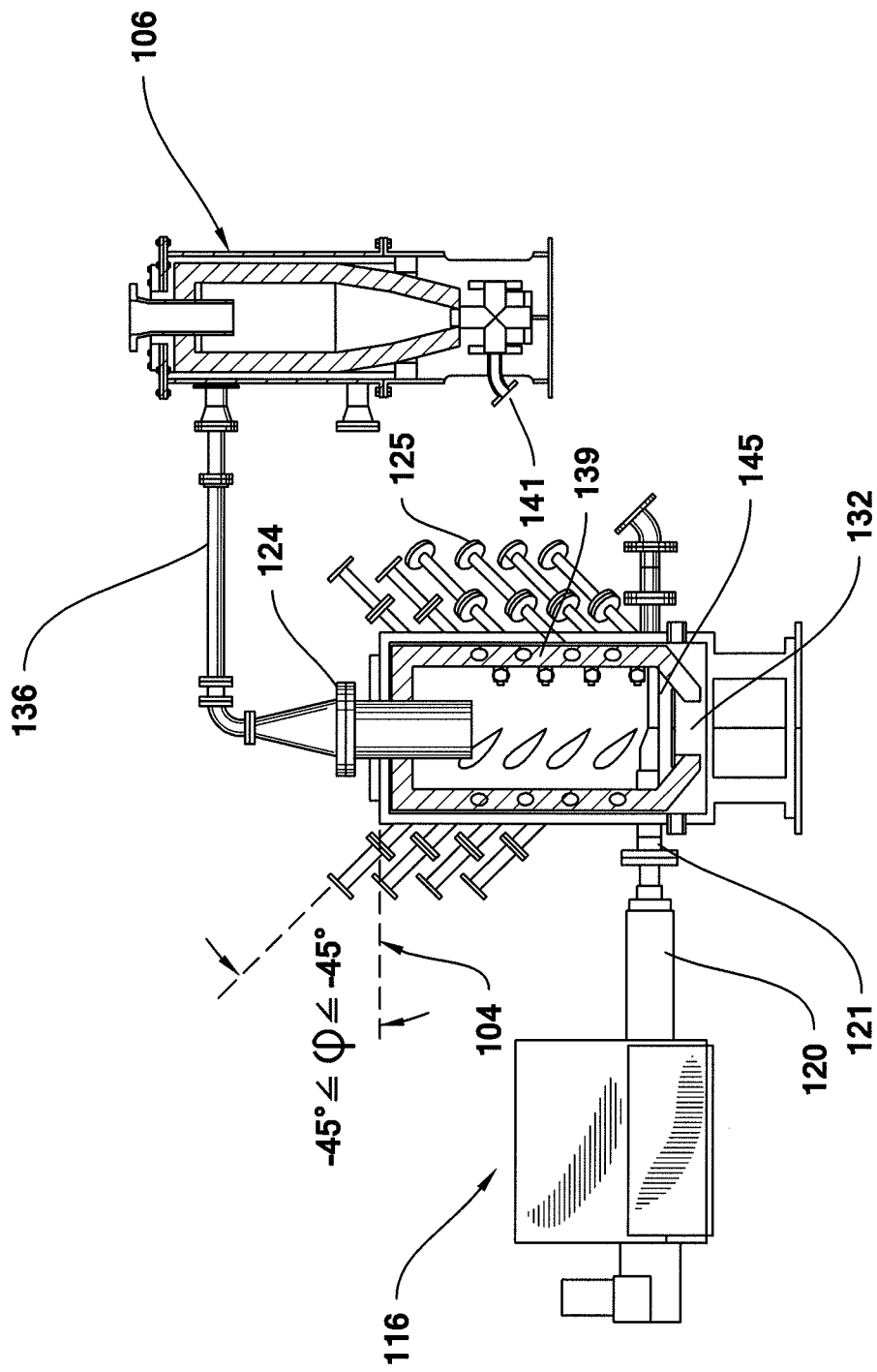
FIG. 4 illustrates an elevation view of certain components of the gasification system of FIG. 3 with some of these components being shown in cross-section.
Figure 5:
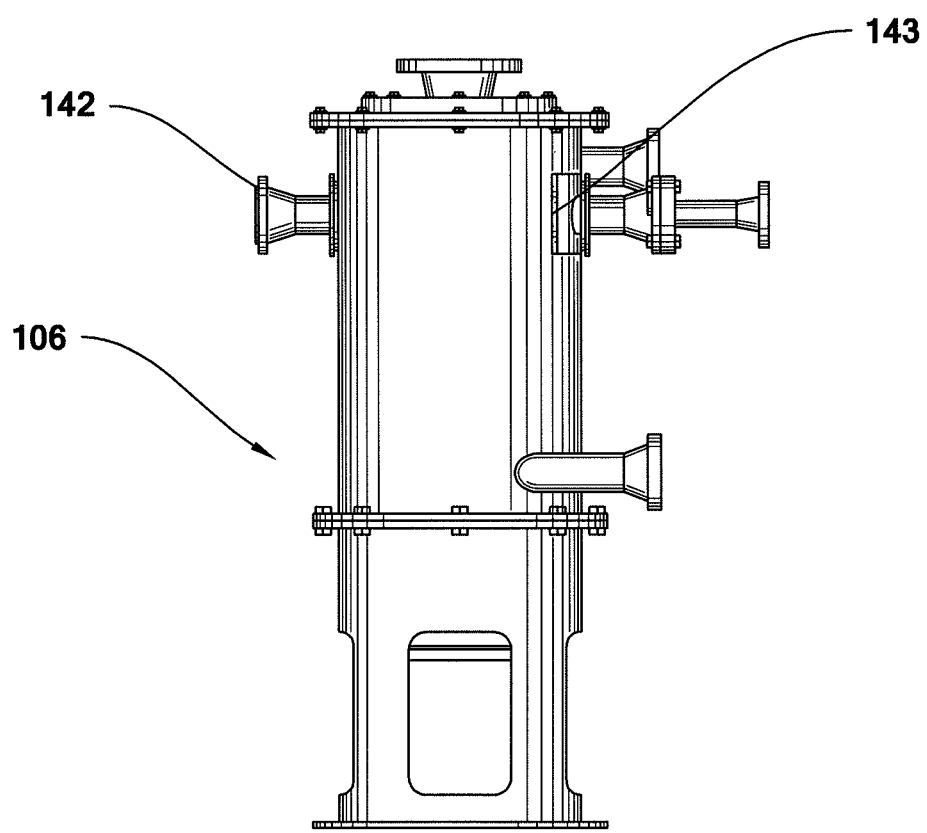
FIG. 5 illustrates a side view of a second gasifying unit of the gasification unit of FIG. 2 in accordance with the present invention.

Referring to FIGS. 1-2, an embodiment of a gasification system, shown generally at 100, for converting a variety of biomass materials or materials into a producer gas (PG) is shown. In general, the gasification system 100 includes, but is not limited to, a biomass feeding mechanism or system 102, a main gasifier unit 104, a polishing gasifier and/or a particle separator unit 106, an accumulator unit 108, a combustion engine 110, and an electrical power generating machine 112.

As best shown in FIG. 2, the biomass feeding system 102 is comprised of a biomass hopper bin 114 and a biomass drier/feeder unit 116. Biomass material is placed into hopper bin 114 which feeds into the drier/feeder unit 116, which may be powered by a motor (not shown). The drier/feeder unit 116 can be an off the shelf solid feed mechanism that is partially or preferably fully enclosed, insulated, and/or externally heated. The drier/feeder unit 116 can take one of many forms including a rotary valve, a flat bed conveyer, a rotary feed screw, or preferably a spinning drum having external rollers. The drier/feeder unit 116 is preferably enclosed to optimize heat transfer, so as to initiate, and substantially complete a drying process. The drier/feeder unit 116 may further include instrumentation (temperature, pressure and/or relative humidity sensors) to monitor and ensure that no pyrolysis (i.e., anaerobic conversion of the biomass material to char, oils and gases) is initiated that would otherwise prematurely initiate the gasification process of the system 100 and lower the calorific content of any resultant PG. The instrumentation may be one or more of the following: thermocouples and/or pressure transducers, lower explosion limit (LEL) metering devices and humidity/dew point monitoring devices.

Figure 6:
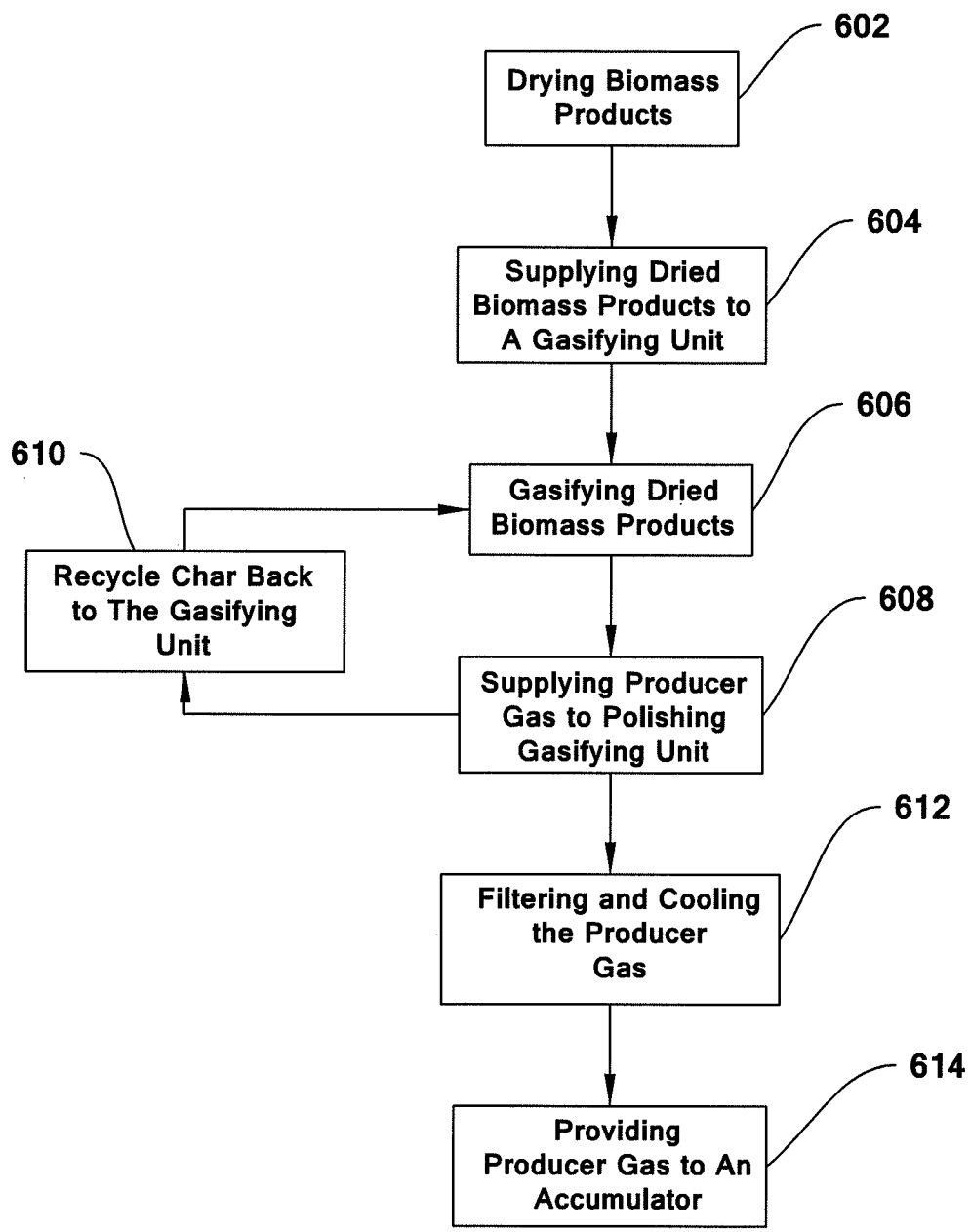
FIG. 6 is a flow diagram illustrating a process of gasifying biomass materials in accordance with the invention.

The biomass feeding system 102 may utilize spent heat from either the producer gas itself or exhaust from the internal combustion engine 110 in both hopper bin 114 and drier/feeder unit 116, to accomplish the drying process or initial step of the overall gasification process, at Step 602 of FIG. 6. A net forward progress or speed of the biomass material through the drier/feeder unit 116 and the length of the drier/feeder unit 116 can be used to set the desired residence time of the biomass material inside the drier/feeder unit 116. By closely monitoring and controlling the pressure, temperature, dew point and residence time inside drier/feeder unit 116 through input heat variation, the moisture content of the biomass material can be accurately reduced to a desired level, preferably 8-20% or more preferably 8-15%, before entering the main gasifier unit 104, thereby reducing endothermic energy requirements in subsequent gasification reactions. The temperature, for instance shall be preferably maintained near the water evaporation/boiling temperature for the prescribed atmospheric conditions (212° F. for a pressure of 1 atm, for instance) while the pressure shall preferably not be allowed to raise roughly 10% above the nominal/baseline. Else, evidence of premature pyrolysis may be evident within the feed/driver unit. The reduction in heat input to the main gasifier unit 104 can increase the resultant energy content of the PG because less oxidizer (for combustion purposes) will be required to sustain the endothermic gasification reactions inside the main gasifier unit 104, which in turn reduces the dilution effects attributed to the presence of nitrogen in the input oxidizer stream.

The hydrogen content of the PG can also be maximized by controlling the moisture content of the biomass materials. Higher hydrogen content may be desirable for powering the operation of downstream combustion devices, such as the internal combustion engine 110. The moisture content variation may be accomplished by varying the thermal input load to biomass feeding system 102 through either manual and/or automated valves 202 connected to indirect heat exchangers to which it is connected. Once dried, the biomass material is then supplied through a conduit or pipe 120, coupling the drier/feeder unit 116 and the main gasifier 104, to an input or entry port 121 of the main gasifier 104 for further processing, at Step 604 of FIG. 6. A lower portion of the main gasifier 104 may be chosen for placement of the entry port 121—because it substantially corresponds to a point within the man gasifier 104 where internal flow reversals, high turbulence and velocity occur. These conditions in essence levitate the injected biomass material and entrain it into the prescribed gasifier flow field that exists inside the main gasifier 104. Alternatively, the biomass injection point may be located at more elevated conditions so as to give the biomass more residence time and hence more time for gasification.

Alternatively, multiple feeding systems can be utilized to provide redundancy in the case of a failure of a single drier/feeder unit 116, and to allow for replacement of a defective feed mechanism during operation of the gasification system 100. It may be desirable that the one or more feeding systems feed biomass material through multiple ports of the lower portion of the main gasifier 104 to provide improved distribution and subsequent reaction of the feed material inside the main gasifier 104. The biomass material can equivalently be injected at alternate elevation points depending on the internal flow field being generated inside the main gasifier 104 at a given time per the reasons above.

Now referring to FIGS. 2-6, the main gasifier unit 104 is configured to simultaneously accomplish three separate gasification processes to potentially yield a medium BTU producer gas, with minimal tar and char generation, at Step 606 of FIG. 6. These three gasification processes are: cyclonic, vortex and fluidized bed gasification strategies. These three gasification processes are accomplished through the combined effects of high internal turbulence generation, a highly recirculatory, toroidal and reversing flow pattern and extended residence times inside the main gasifier 104. To support the three separate gasification processes, the main gasifier unit 104 includes tangential air entry or injection ports 123, variable angle air injection ports 125, and a tangentially oriented starter burner 127. Although air is commonly used as the gasifying medium injected into the main gasifying unit 104 via injection ports 123 and/or 125, other gasifying mediums or agents may be utilized such as, but not limited to, oxygen, steam and/or water. Other important functional features of the main gasifier unit 104 include lower and mid entry servicing ports 129. The main gasifier 104 is also insulated and constructed such that it can be cooled by forcing air, nitrogen, or other gas/medium through an annular passage surrounding its exterior or by the gasifying agent itself. Both the tangential air injection ports 123 and variable angle air injection ports 125 are distributed along the entire vertical length of the main gasifier unit 104. The variable injection angle air injection ports 125 have a preferentially downward or upward injection angle or orientation φ, between zero and forty-five (45) degrees from horizontal. As shown, two sets of variable injection angle air injection ports 125 are formed on the main gasifier unit 104, a first set having a downward injection angle of 22.5 degrees from vertical and the second set having a downward injection angle of 45 degrees from horizontal. Although only two sets of variable downward injection angle air injection ports are shown, any suitable number of variable upward and downward injection angle air injection ports may be used. The variable injection angle air injection ports 125 are preferably diametrically opposed to the input port 121. The tangential starter burner 127 is preferably located near the upper portion of the main gasifier (to permit a more thorough and uniform heating of the interior walls) unit 104 and is utilized to heat the interior walls of the main gasifier 104, prior to initiating the gasification reactions.

Figure 10:
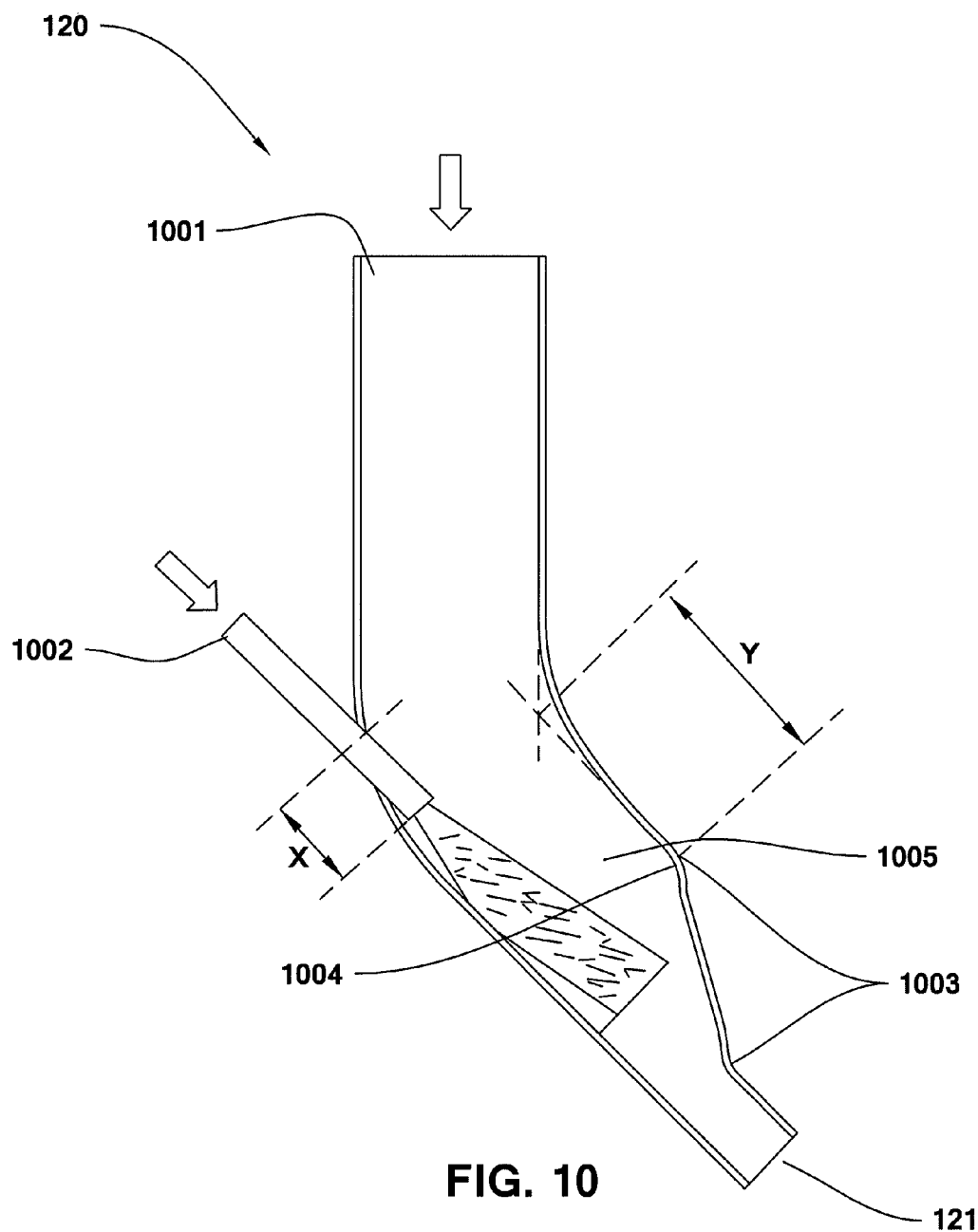
FIG. 10 illustrates a cross-sectional view of an alternate embodiment of a feeding mechanism for introducing biomass materials into a gasifying unit in accordance with the present invention.

During operation, the dried biomass material may be supplied from the feeding system 102 to the lower portion 122 of the main gasifier unit 104 after first being mixed and accelerated with gasifying air in a biomass injection conduit 120 as shown in FIG. 10. Referring further to FIG. 10, the biomass injection conduit 120 is comprised of a driver gasification medium conduit 1002, a biomass input conduit 1001 and a combined exit conduit 1005. The gasification medium conduit 1002 is preferably 0.5 to 6 inches in diameter and is configured such that the location where the driver jet of gasifying medium traveling down the conduit impacts the interior wall of the combined exit conduit 1005 is downstream of the aerodynamically smoothed, corner vertex 1004. In a preferred embodiment, the driver gas conduit non-dimensional depth ratio $X^*$ is between 1 and 1.9. $X^*$ is defined by the formula $x/d_b$ where $d_b$ is the diameter of biomass input conduit 1001 and x is the insertion depth of the driver gasification medium conduit 1002 that is integrated inside biomass input conduit 1001. In addition, the combined exit conduit length ratio $Y^*$ is greater than 0.3 to avoid turbulence and preferably between 1.25 and 1.9. $Y^*$ is defined by the formula $y/d_b$ where $d_b$ is the diameter of biomass input conduit 1001 and y is the length between the beginning of combined exit conduit 1005 and corner vertex 1004. The gasification medium traveling down conduit 1002 is derived from a portion, preferably less than 10%, of the gasifying air being injected into the main gasifier 104. The gasification medium conduit 1002 may optionally include a bypass leg (not shown) to direct a portion of the input driver gasification medium (preferably less than 10%) up into the biomass input conduit 1001 in a tangential fashion to mitigate "bridging." The interior of the biomass injection conduit 120 is extensively aerodynamically conditioned through rounded edges 1003 and gradual expansion and contraction of conduit diameter to minimize turbulence generation, flow separation and/or recirculation zones. These features also minimize biomass residence time in the conduit 120 which inhibits premature gasification reactions if a heated driver stream is employed. The gasifying medium, preferably air, travels down the gasification medium conduit 1002 and entrains dried biomass traveling down the biomass input conduit 1001. The gasifier air is added well upstream of input port 121 to ensure a thorough and aerated mix and acceleration of the solid/dried biomass material to attain the flow field conditions/velocities that exist inside the main gasifier 104. Injection of the biomass material with the proper velocity is critical to ensure optimized performance of the main gasifier unit 104.

Alternatively, the biomass material may be supplied to the main gasifier 104 without first being mixed and accelerated with air, i.e. supplied without air assistance. The biomass material is accelerated and injected onto the previously heated walls of the main gasifier 104 and follows a toroid and helical flow path, recirculating several times within the main gasifier 104 depending on particle size of the biomass material. Together, the tangentially and downwardly oriented air entry ports 123 and 125 serve to tightly control gasification processes/reaction redox mechanisms by adding precise amounts of oxidizer at strategic locations. Oxidizer penetration and input velocity can be adjusted through insertion of various smaller or larger diameter inserts/(nozzles) (aerodynamically smooth area contraction devices) (not shown) into the penetrations associated with the oxidizer entry injections 123 and 125. As such, the momentum of air or other gasifying medium can be varied as desired among the air injection ports 123 and 125 to improve the control of the various gasification processes. Care must be added, however, that this does not artificially increase resultant blower energy requirements through increase pressure drop.

The variable angle air injections generate strong fluid forces that force the biomass material unit to follow a three dimensional flow path that is characterized by strong downward and helical motion which then reverses near the lower portion 122 of the main gasifier 104, in the vicinity of the grate 132. Depending on particle size, the biomass material particles may recirculate several times before they are sufficiently gasified and exit the main gasifier 104 via a top end exit port 124. Heavier particles of the biomass material may hit an internal wall of the main gasifier 104 (as in a standard cyclone gasifier) and fall to the lower grate 132, whereby lower air injection ports 123 and/or flow reversals quickly levitate the particles (in the manner of a fluidized bed gasifier) and in some cases, depending on particle size, force the particles to recirculate. The recirculatory flow field so established also ensures minimal tar formation by forcing the pyrolysis gases to recirculate within the main gasifier 104 before exiting. Continual recirculation of the gases and oils as in a vortex gasifier enables thermal cracking/decomposition of the tars into lighter hydrocarbon species, mitigating potential downstream engine wear and condensate drop-out. After sufficient time, preferably several hundreds of milliseconds, the resultant PG exits the main gasifier 104 through the top exit port 124 and is supplied through an appropriately sized "feeder" tube 136 with interior diameter greater than 1.75 inches, and preferably greater than 2 inches to minimize frictional pressure losses, to the downstream polishing gasifier or particle separator.

In addition to the resultant PG, generated ash is separated from the mature PG by gravity towards a port 135 located at the bottom of the main gasifier 104, to be collected and disposed of as desired. This collected ash can be cooled and/or quenched with water or other high heat capacity mediums, and used in various refractory materials such as roofing tiles, cement and paving asphalt.

The main gasifier unit 104 may contain sensors (static pressure transducers, thermocouples and/or dew point sensors—not shown) to sense the pressure and/or temperature inside the main gasifier unit 104, as well as gas sampling ports (not shown) and appropriate gas analysis equipment (gas analyzers—not shown) to monitor the gasification process, reaction kinetics and/or resultant PG calorific value. In a preferred embodiment, gas sampling ports may be located after both the main and polishing gasifiers 104 and 106. The measurements taken from these devices can be used to optimize the reaction kinetics, temperature and residence times in the main gasifier unit 104 needed to improve the three gasification processes.

The mature PG from the main gasifier 104 is then fed to the polishing gasifier 106 for further processing and particle separation through an input feed line 136, at Step 608 of FIG. 6. The design of the polishing gasifier 106 may follow the same design practices associated with standard cyclone particle separators but can also be used as a secondary gasification unit, if so desired, through integration of a secondary air injection system 151 into its main PG input feed line 136. As with the main gasifier 104, the air injection should be accomplished well upstream of the entrance to the polishing gasifier 106 to ensure a thorough mix. A return line 138 from a bottom end 140 of the polishing gasifier 106 and connected to or near the lower portion 122 of the main gasifier 104 near one of the aforementioned air injection ports 125 ensures any char carryover is re-administered back into the process. The angle of repose is greater than 30 degrees from vertical at the point where the return line 138 (not shown) joins the main gasifier 104 to ensure a continual flow of ash and/or char back to the main gasifier, but at least 45 degrees from vertical. Similar to the main gasifier 104, the polishing gasifier 106 further includes a starter burner 142, located near the top of the polishing gasifier 106. As with the main gasifier, the starter burner 142 is utilized to preheat the interior walls of the polishing gasifier 106, which is also equipped with a servicing port 143. During operation, the polishing gasifier 106 acts to separate the remaining non-gasified particles from the mature PG gas. Other than the re-administered char discussed above, the gasification process also produces ash, which is separated from the mature PG circulating within the polishing gasifier 106 by gravity towards a port 141 located at a bottom end of the funnel-shaped polishing gasifier 106.

As noted above, while serving as a second gasification unit, the polishing gasifier 106 can further include air injection ports (not shown) to add air, oxygen, or steam, as needed, to the circulating or swirling PG to convert further char to producer gas. As discussed above in relation to the main gasifier unit 104, the air injection ports can be tangential and/or variable angle air injection ports, located preferably at the middle portion and/or an upper portion of the polishing gasifier (for increased resident times) 106 to further complete gasification.

Referring to FIGS. 2-5, while operating as a cyclone separator, the polishing gasifier 106 serves to separate biomass material particles transported with the mature PG. From the polishing gasifier 106, the separated biomass material particles are returned to the main gasifier 104 through the return line 138, at Step 610 of FIG. 6. In one embodiment, before reaching the accumulator unit 108, the mature PG is filtered by a first filter 146, and then cooled by a heat exchanger unit 148, at Step 612 of FIG. 6. The remaining mature PG is then administered or supplied to the accumulator unit 108 through a PG line 144, at Step 614 of FIG. 6. The heat removed by the heat exchanger unit 148 from the mature PG serves to raise the temperature level of an air supply provided by an air blower assembly 149, to be fed to the lower portion of the main gasifier unit 104 through line 150. The cooled mature PG is then fed to a second heat exchanger unit 152, a cooler/chiller unit 154, and then to a second filter 156 before entering the accumulator 108. Additionally, a second air blower assembly 157 may be used to supply additional air to the main gasifier unit 104 as needed for cooling purposes.

For the purpose of generating electrical power, the accumulated mature PG can be supplied to an engine 110, which may be a gasoline powered internal combustion engine, via a carburetor 111, or equivalently a gas turbine, which in turn is coupled to an electric generator 112. The hot air exhaust generated by the motor 110 is feed through a third heat exchanger 158 to raise the temperature level of the air or liquid circulating within line 160 that is connected to the second heat exchanger 152 and can be used to heat liquid coolant and/or provide heat to for the biomass hopper and feeder/drier unit.

One aspect of the invention is the scalable size of the gasifying system 100 which can be developed for a sub one (1) megawatt (MWe) size, and can be scaled to address larger needs including factories, communities and/or cities. The compact size of the gasification system 100 can occupy a desirably small footprint, and can be packaged and readily deployed in a Department Of Transportation (DOT) approved vehicle from location to location. The self contained biomass gasifying system 100, which couples an innovative feeding/drying process to the gasifier and electric generation processes, does not generate superfluous co-products. The system's high efficiency and lower cost requirements ("Opex" and "Capex") permit smaller scale, distributed biorefineries to be viable for rural communities and beyond, thereby enabling local feedstock supplies and leveraging existing infrastructure for reliable, point of use heat and power generation.

The gasifying system 100 is configured to produce producer gas from a variety of renewable biomass materials or feedstocks including, but not limited to, food processing wastes (FPW), forestry industrial wastes (FIW), and municipal green wastes (MGW) to provide clean point of use heat and power for the farming and food industries, to name just two. Specific examples of lower grade materials or feedstocks include, but not limited to, nut processing wastes (walnut, pecan, peanut shells, etc.), sewage cake, yard clippings, wood chips, etc.

Figure 7:
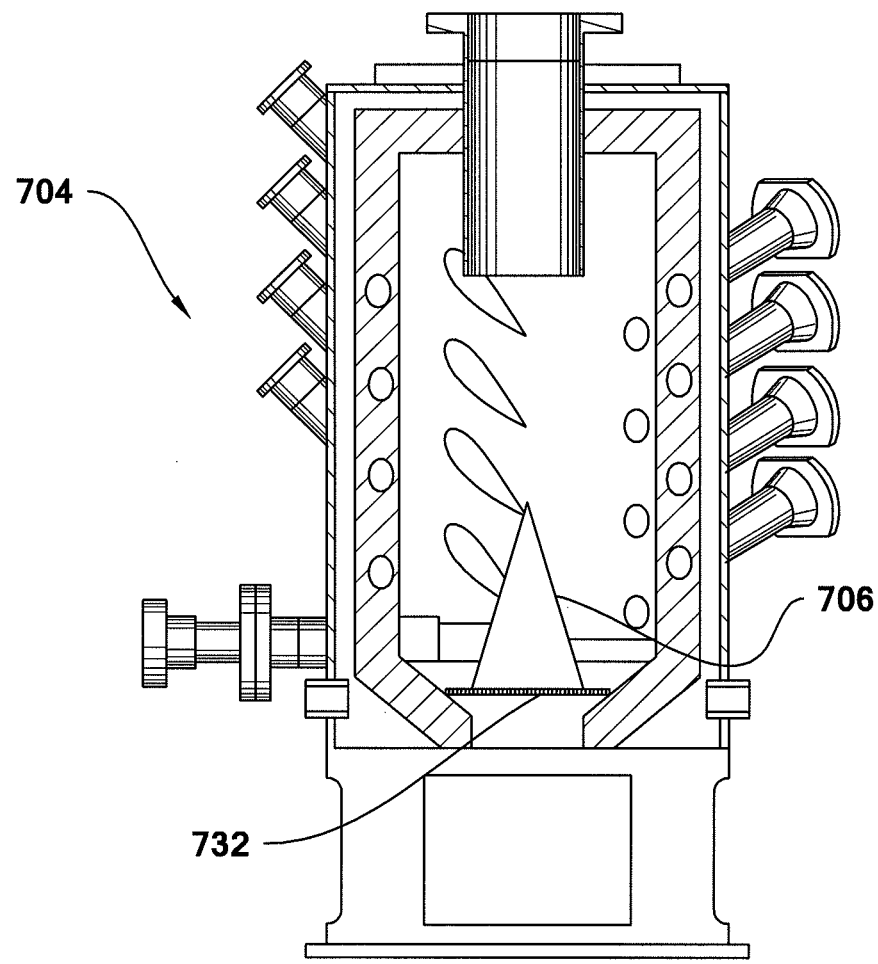
FIG. 7 illustrates a cross-sectional view of another embodiment of the first gasifying unit that includes an axisymmetric center body near the bottom in accordance with the present invention.

Now referring to FIG. 7, a cross-sectional view of another embodiment of the first gasifying unit 704, which includes a substantially conical centre body 706 near the bottom, is shown. As discussed above in reference to FIG. 4, the first gasifying unit 104 can also serve as a cyclone separator. During operation, interior fluid dynamic forces, generated by the air injections, create a complex three dimensional (3D) flow field that may have a downward spirally motion of biomass particles near the internal walls 139 of the gasifying unit 104, and an upward spirally motion along a center line of the gasifying unit 104. As such, the biomass particles are flung towards the outer walls if they are too large to be carried by the flow field. Once the large biomass particles hit the internal walls 139, they drop to the lower grate 132 for removal. As the flow field moves downward, there is a point where flow field reversals occur. Moreover, as the flow field moves into the downward conical portion 145 of the main gasifying unit 104, circumferential velocities increase and smaller and smaller biomass particles are progressively centrifuged towards the internal walls 139. Once the small biomass particles hit the internal walls 139, they drop to the lower grate 132 located immediately underneath since the velocity at the walls 139 is substantially zero.

Figure 8:
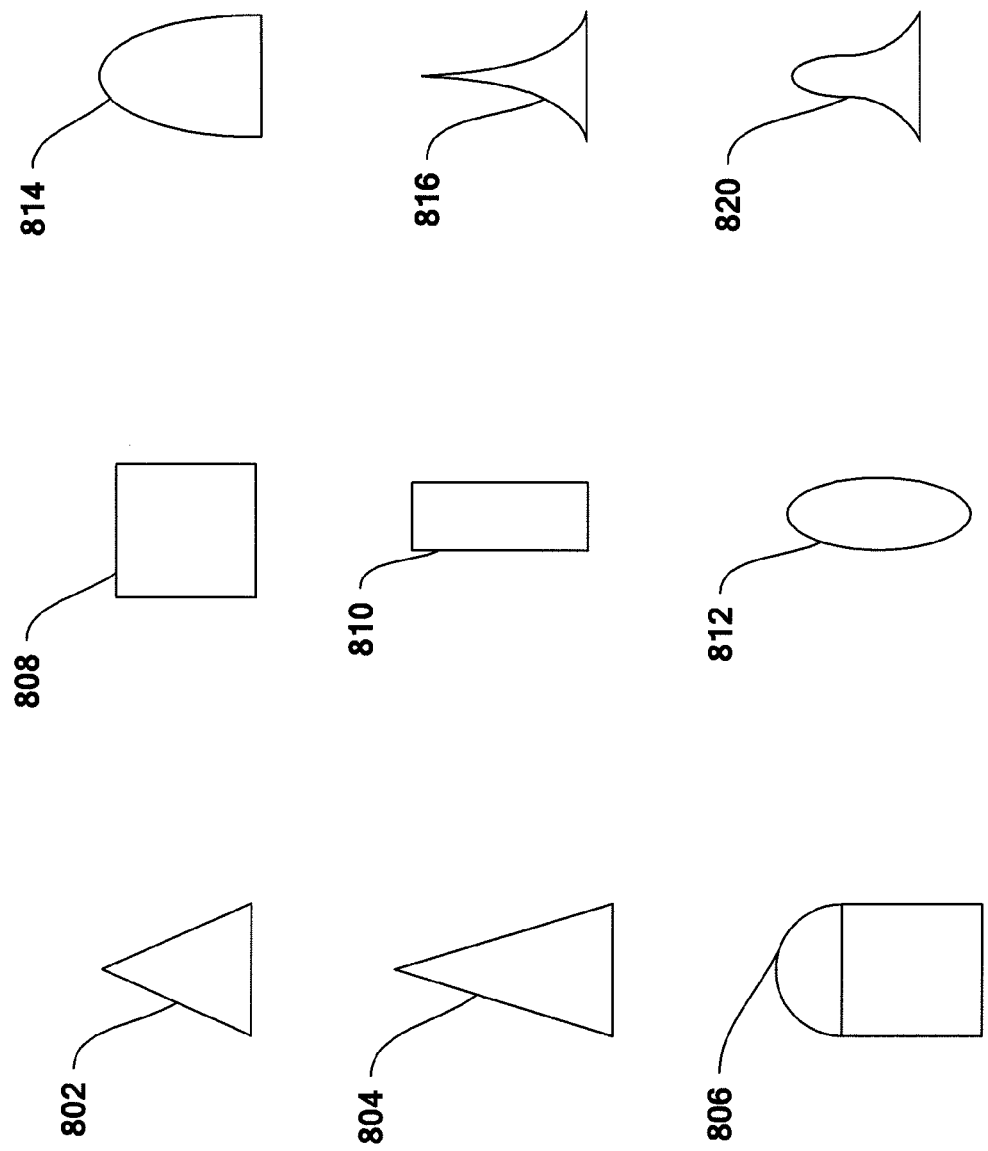
FIG. 8 illustrates side views of a plurality of axisymmetric centre bodies in accordance with the present invention.

To better facilitate packaging in a DOT approved transport carrier, the main gasifying unit 104 can be truncated in overall size. One way of truncating its overall size is to shorten the lower conical portion 145, while still providing the desired cyclonic characteristics of the main gasifying unit 104. In the embodiment of FIG. 7, the main gasifying unit 704 includes an axisymmeteric centre body 706 at its bottom along the vertical central axis and above grate 732 (the grate is not shown in the Figure). By providing the centre body or element 706, the main gasifying unit 704 can reproduce the flow field characteristics of the above-discussed flow field in a more compact form. As such, the insertion of a centre body 706 provides flow field aerodynamics that facilitate particle separation efficiencies in a more compact configuration. Further, the generated flow field can be modified in accordance with a desired situation or device usage by modifying the geometry or shape of the centre body 706. As such, the centre body 706 can be configured as desired in a plurality of shapes 802-820, shown in profile, while being substantially symmetric with respect to the vertical central axis, as shown in FIG. 8. Although only nine different shapes are shown, one of ordinary skill in the art would understand that other shapes can be utilized for the desired gas producing situation.

Figure 9:
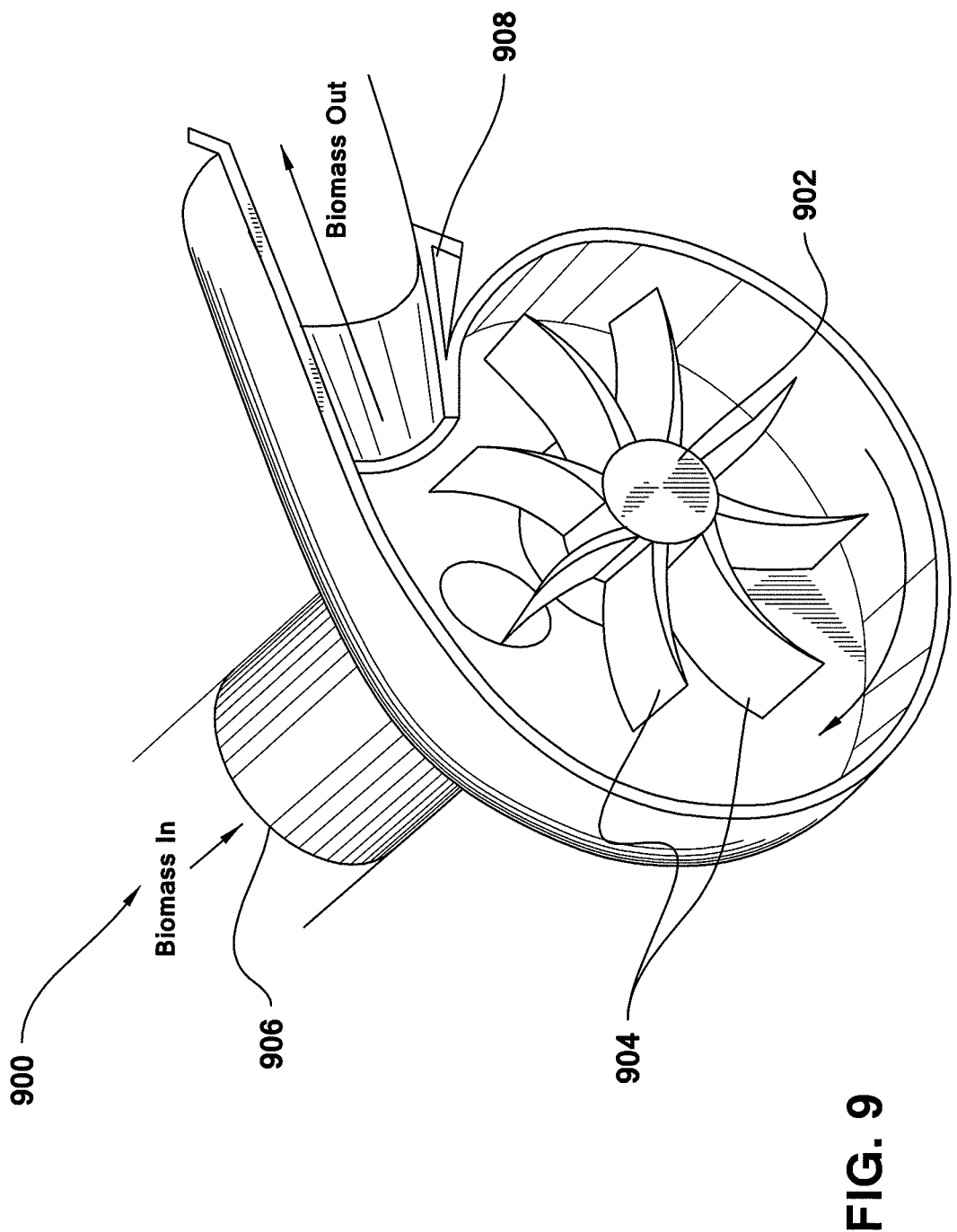
FIG. 9 illustrates a cross-sectional view of an alternate embodiment of a feeding mechanism for introducing biomass materials into a gasifying unit in accordance with the present invention.

As stated above, the implementation of the feeding system 102 can take one of many forms including a flat bed conveyer, a linear feed screw, a rotary feed screw, a gravity feed, and a spinning drum having external rollers. In FIG. 9, an alternate biomass feeding system 900 is shown. The feeding system 900 is a rotary injection system, which includes a centrifugal throwing wheel 902 and associated vanes or blades 904. The throwing wheel 902 can be coupled to a motor or other driving mechanism (not shown), whose rotational speed can be controlled as desired, thereby controlling the injection speed/rate of the biomass materials into the main gasifying unit 104. The biomass feeding system 900 can be attached or coupled at one input end to a volute or scroll (not shown), which supplies the biomass materials, and is attached at an output end to the entry port 121 for injecting the biomass materials into the main gasifying unit 104. The biomass feeding system 900 can generate high injection velocities to enable the biomass materials to be flung into the main gasifying unit 104 and be quickly entrained in the internally generated cyclonic flow field. By judicious adjustment of the injection velocities, the biomass feeding system 900 enables the injected biomass materials to impact the internal hot wall, thereby further accelerating gasification reactions. One advantage in utilizing the feeding system 900 is that, due to its rotary injection system, the process of providing the biomass materials to the main gasifying unit 104 does not require any (or minimal) gasifying mediums to accelerate the biomass materials through entry port 121. Moreover, it may be desirable to control the feeding pattern of the biomass materials by altering the leading surface of the vanes 904. For example, a vane with slightly flaring, rather than straight, sidewalls allows any particles that happen to be directed laterally to spread out rather than be contained by a channel provided by a vane with essentially parallel edges. This lateral spreading of the biomass materials as they enter the gasifying unit 104 can hasten the heating of the biomass particles, thereby accelerating the gasification process.

Although exemplary embodiments of the invention have been described in detail above, those skilled in the art will readily appreciate that many additional modifications are possible in the exemplary embodiment without materially departing from the novel teachings and advantages of the invention. Accordingly, these and many additional modifications/alterations are intended to be included within the scope of this invention.

We claim:

1. A system for gasifying biomass materials, comprising:
a gasifying unit configured to convert biomass materials into a producer gas, the gasifying unit including a plurality of gasifying medium injection ports distributed along a cylindrical wall of the gasifying unit, wherein the plurality of gasifying medium injection ports have injection angles that include at least one of an upward tangential angle and a downward tangential angle;
a feeder mechanism positioned below each of the plurality of gasifying medium injection ports distributed along the cylindrical wall of the gasifying unit and configured to introduce the biomass materials into the gasifying unit;
a grate located on an internal bottom end of the gasifying unit and configured to receive the biomass materials; and
an axisymmetric center body located above the grate on the internal bottom end of the gasifying unit, the axisymmetric center body extending into the vertical length of the gasifying unit.

2. The system of claim 1, further comprising another gasifying unit or a polishing unit located downstream of the gasifying unit, wherein the polishing unit serves to separate char and ash particles from the producer gas and complete the gasification process.

3. The system of claim 2, further comprising a return feed from the another gasifying unit or the polishing unit to the gasifying unit to provide char particles back to the gasifying unit for further gasification and/or ash particles for separation.

4. The system of claim 1, wherein the feeder mechanism includes a drying mechanism.

5. The system of claim 1, wherein the axisymmetric center body is a conical shape comprised of a base portion and a top point located within the vertical length of the gasifying unit.

6. The system of claim 5, wherein the axisymmetric center body is positioned at the internal bottom end of the gasifying unit to promote, at least in part, a predetermined flow field within the gasifying unit.

7. The system of claim 1, wherein a gasifying medium flowing through the plurality of gasifying medium injection ports is one of air, oxygen, steam and water, or any combination thereof.

8. The system of claim 1, wherein the feeder mechanism is an integrated feed and drying mechanism.

9. The system of claim 1, wherein the feeder mechanism includes a rotary injection system.

10. The system of claim 1, wherein the feeder mechanism includes a conduit for supplying a gasifying medium such that the gasifying medium supplied through the conduit accelerates the biomass materials into the gasifying unit.

11. The system of claim 1, wherein the gasifying unit is configured to inject a gasifying medium into the gasifying unit through the plurality of gasifying medium injection ports so that the gasifying medium provides, at least in part, a propulsion to move the biomass materials within the gasifying unit in a specified flow pattern at a specified velocity.

12. The system of claim 11 wherein the feeder mechanism is configured to accelerate the biomass materials in a direction that is tangential to the specified flow pattern within the gasifying unit.

13. The system of claim 11 wherein the specified flow pattern and velocity cause the biomass materials injected into the gasifying unit to follow a three dimensional toroid and helical flow path.

14. A method for gasifying biomass materials, comprising:
causing a gasifying medium to be introduced into a gasifying unit through a plurality of gasifying medium injection ports to convert the biomass materials into a producer gas, wherein the plurality of gasifying medium injection ports are distributed along a cylindrical wall of the gasifying unit, and wherein the plurality of gasifying medium injection ports have injection angles that include at least one of an upward tangential angle and a downward tangential angle;
causing a feeder mechanism coupled to the gasifying unit to introduce the biomass materials into the gasifying unit though an entry port, wherein the feeder mechanism is positioned below each of the plurality of gasifying medium injection ports distributed along the cylindrical wall of the gasifying unit;
causing at least some of the biomass materials to fall through a grate located on an internal bottom end of the gasifying unit; and
causing the biomass materials introduced into the gasifying unit to flow around an axisymmetric center body located above the grate on the internal bottom end of the gasifying unit.

15. The method of claim 14, further comprising:
controlling the transfer of the producer gas from the gasifying unit to a polishing unit located downstream of the gasifying unit, and
causing the polishing unit to separate char and ash particles from the producer gas.

16. The method of claim 15, further comprising:
controlling the transfer of char and ash particles from the polishing unit back to the gasifying unit through a return feed line.

17. The method of claim 14, wherein the axisymmetric center body extends into the vertical length of the gasifying unit.

18. The method of claim 14, wherein the feeder mechanism includes a rotary injection system.

19. The method of claim 14, further comprising:
causing a gasifying medium to be supplied through a conduit of the feeder mechanism coupled to the gasifying unit such that the gasifying medium supplied through the conduit accelerates the biomass materials into the gasifying unit.

20. The method of claim 14, further comprising:
causing a gasifying medium to be supplied through the plurality of gasifying medium injection ports so that the gasifying medium provides, at least in part, the propulsion to move the biomass materials within the gasifying unit.

21. The method of claim 14, wherein the axisymmetric center body is a conical shape comprised of a base portion and a top point located within the vertical length of the gasifying unit.

* * * * *